FLEXIBLE LOGIC CIRCUIT

Filed Oct. 7, 1960 2 Sheets-Sheet 1

INVENTOR.
MICHAEL E. SZEKELY
BY John V. Regan
ATTORNEY

FLEXIBLE LOGIC CIRCUIT

Filed Oct. 7, 1960

2 Sheets-Sheet 2

INVENTOR.
MICHAEL E. SZEKELY
BY John V. Regan
ATTORNEY

United States Patent Office 3,201,574 Patented Aug. 17, 1965

3,201,574

FLEXIBLE LOGIC CIRCUIT

Michael E. Szekely, Belle Mead, N.J., assignor to Radio Corporation of America, a corporation of Delaware Filed Oct. 7, 1960, Ser. No. 61,167
9 Claims. (Cl. 235—175)

The present invention relates to logic circuits which are useful in data processing equipment. More particularly, the invention relates to "flexible" logic circuits, that is, circuits which are capable of generating any one of a number of different logic functions.

The flexible logic circuit of the invention derives from input signals indicative of binary digits X and Y an output signal S defined by the Boolean equation $$S=Q_1XY+Q_2\overline{XY}+\overline{Q}_3X\overline{Y}+\overline{Q}_4\overline{X}Y$$

where $Q_1$, $Q_2$, $Q_3$ and $Q_4$ are control signals indicative of binary digits. The circuit includes a first "and" circuit receptive of signals $Q_1$, X and Y, a second "and" circuit receptive of signals $\overline{C}$ and X, a third "and" circuit receptive of signals $\overline{C}$ and Y, and a fourth "and" circuit receptive of signals $\overline{C}$ and $Q_2$, where $\overline{C}=Q_3X+XY+Q_4Y$. The outputs of the four "and" circuits are applied to an "or" circuit to obtain S.

S in the equation above defines the 16 logic functions which are possible for two binary digits X and Y. For example, it can easily be seen that when $Q_1=1$, $Q_2=0$, $Q_3=1$ and $Q_4=1$, then $S=XY$, that is, S defines the logic function "and." Similarly, other permutations of the four control voltages $Q_1$–$Q_4$ provide other logic functions S such as "or" $(X+Y)$, "nand" $(\overline{XY})$, "nor" $(\overline{X+Y})$ and so on. Moreover, with interconnection of control leads in ways to be described in more detail below, the circuit can perform full addition, a form of subtraction and so on. Finally, the circuit can also simultaneously produce more than one logic function and these simultaneously produced functions can in many cases be related to one another in useful ways as is explained more fully below.

The circuit discussed above may be made up of a relatively small number of substantially identical semiconductor elements—unipolar transistors, some acting as active elements and some as passive elements such as resistors. The circuit is arranged so that all such elements may be serially connected source-to-drain, drain-to-drain or source-to-source and integrated into one or two pieces of semiconductor.

This circuit has a number of important advantages. The semiconductor elements are of small size and may be closely packed. The same circuit configuration is used regardless of the logic function performed so that mass production of the circuit in modular form is feasible. For example, the circuit is adapted for mounting on standard micromodule wafers 0.31" x 0.31" x 0.01". Finally, substantially identical units are used for both passive and active circuit elements thereby simplifying the manufacturing technique and greatly reducing costs.

The invention is described in greater detail below and is described in the following drawings of which:

There are four possible combinations of two binary input quantities X and Y. These are given in the table below:

*Table I*

| X | Y |
|---|---|
| 0 | 0 |
| 0 | 1 |
| 1 | 0 |
| 1 | 1 |

For each of the four XY combinations above, the output can assume one of two values, namely "0" or "1." With four possible input values and two possible output values for each input value, there are $2^4$ or 16 different permutations of input and output values which are possible. These are the 16 logic functions for two binary input quantities. The table below lists the permutations. The numbers "00" at the head of column 1 indicate that $X=0$ and $Y=0$. The numbers "1, 0" at the head of column 2 indicate that $X=1$ and $Y=0$, and so on. The binary digits "0" and "1" in the columns indicate the value of the output for various input values. The Gray code is followed.

*Table II*

| Possible Inputs | 1<br>00 | 2<br>10 | 3<br>11 | 4<br>01 | Boolean Equation Describing Logic Function | Common Name |
|---|---|---|---|---|---|---|
| | 0 | 0 | 0 | 0 | 0 | |
| | 0 | 0 | 0 | 1 | $\bar{X}Y$ | |
| | 0 | 0 | 1 | 1 | Y | |
| | 0 | 0 | 1 | 0 | XY | AND |
| | 0 | 1 | 1 | 0 | X | |
| | 0 | 1 | 1 | 1 | X+Y | |
| | 0 | 1 | 0 | 1 | $X\bar{Y}+\bar{X}Y$ | EXCLUSIVE OR |
| 16 Possible Permuta-tions | 0 | 1 | 0 | 0 | $X\bar{Y}$ | |
| | 1 | 1 | 0 | 0 | $\bar{Y}$ | |
| | 1 | 1 | 0 | 1 | $\bar{X}+\bar{Y}\equiv\overline{XY}$ | NAND |
| | 1 | 1 | 1 | 1 | 1 | |
| | 1 | 1 | 1 | 0 | $X+\bar{Y}$ | |
| | 1 | 0 | 1 | 0 | $\bar{X}\bar{Y}+XY\equiv\overline{X\bar{Y}+\bar{X}Y}$ | EXCLUSIVE NOR |
| | 1 | 0 | 1 | 1 | $\bar{X}+Y$ | |
| | 1 | 0 | 0 | 1 | $\bar{X}$ | |
| | 1 | 0 | 0 | 0 | $\bar{X}\bar{Y}\equiv\overline{X+Y}$ | NOR |

The purpose of the circuits below is to simulate electrically the table above. The variable binary digits are represented by voltages. Similarly, the binary "zeros" and "ones" the permutations of which determine the logic function which is produced, are also represented by voltages. The latter are termed "control" voltages and are identified as $Q_1$, $Q_2$, $Q_3$ and $Q_4$. The circuits are made up of unipolar transistors, some acting as active elements and some acting as passive elements. Such transistors are described in an article by Wallmark and Marcus appearing in the IRE Transactions on Electronic Computers, June 1959, page 98, and elsewhere in the literature. Accordingly, only a brief description is given of these elements and their mode of operation.

Figure 1:
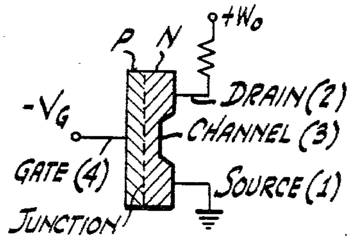
FIG. 1 is a schematic showing of a unipolar transistor.

FIG. 1 is a schematic showing of a unipolar transistor. The body includes a P-type region and an N-type region. Charge carriers (electrons in the present case) flow from the source electrode 1 through the N-type material to the drain electrode 2. The N-type material includes a portion 3 of restricted cross-section known as the "channel." Voltages applied to the gate electrode 4 change the effective cross-section of the channel 3 thereby altering its impedance and controlling the current flow from the source 1 to the drain electrode 2. For example, in the transistor illustrated, as the reverse bias ($-V_g$) on the gate electrode 4 is increased (the gate electrode made more negative), the drain current flow decreases.

A voltage applied to the gate electrode 4 of sufficient amplitude to drive the unipolar transistor to cut off is normally known as the "pinch off" voltage $W_0$. The supply voltage should be equal to or greater than $W_0$ and of opposite sign to $W_0$.

The remaining circuits to be discussed all operate on binary information. The inputs and outputs of the circuit are each at one of two discrete voltage levels, one representing the binary digit "one" and the other representing the binary digit "zero." An input representing one binary digit causes a transistor to which it is applied to conduct heavily. An input representing the other binary digit causes the transistor to be substantially cut off.

The channel region 3 may be formed either of N or P-type material. Transistors of the former type, hereafter termed "N-type" transistors, are shown clear in the other figures of the drawing and transistors of the latter type, hereafter termed "P-type" transistors, are shown cross-hatched in the other figures of the drawing.

Figure 2:
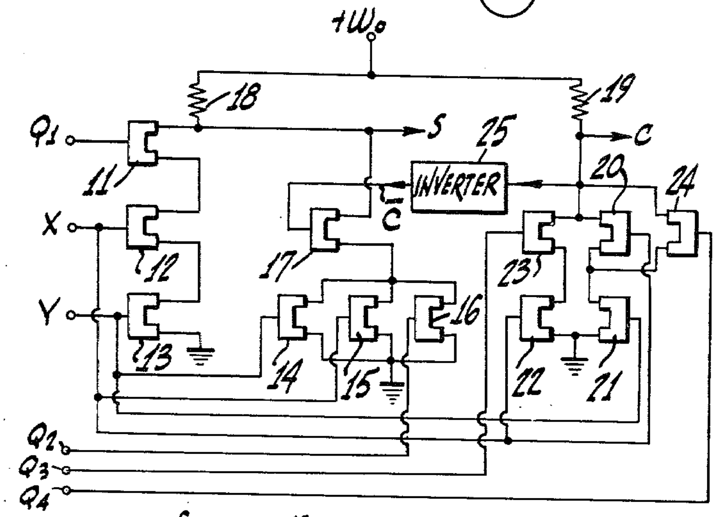
FIG. 2 is a schematic circuit diagram of a flexible logic gate according to the invention.

The following convention is adopted for the circuit of FIG. 2. A binary "zero" input is a voltage sufficient to cut off the transistor.The N-type transistor shown normally has a supply voltage $+W_0$ of the order of +15 volts or greater so that the "zero" input for most N-type transistors may be of the order of −15 volts or $-W_0$. A binary "one" input may be of the order of $-W_0/3$ (−5 volts) or a less negative voltage and this permits the transistor to conduct heavily. A binary "zero" output from the circuit is a voltage equal to about +15 volts. A binary "one" output from the circuit is a voltage equal to $+W_0/3$ or a less positive voltage.

Although the binary inputs and binary outputs of the circuit of FIG. 2 are represented by voltages of different polarities, this causes no difficulty. In practice, a flexible logic net made up of N-type units such as shown in FIG. 2 is followed by a similar flexible logic net made up of P-type units. If, as is the case, the power supply voltage for the P-type network is −15 volts, then a binary "zero" input to that network is +15 volts. This is the same value of voltage as a binary "zero" output from a network of FIG. 2. In like manner, the output voltages of the P-type flexible logic gate are appropriate as input voltages to the N-type flexible logic gates.

Six input voltages indicative of binary digits are applied to the flexible logic circuit of FIG. 2. Four of these, legended $Q_1$–$Q_4$, are control voltages. They determine the logic function to be performed by the circuit. The other two are the input variables X and Y. There are two outputs from the circuit, one legended S and the other legended C.

The circuit of FIG. 2 includes three unipolar transistors 11, 12 and 13 connected in series. A load resistor 18 supplies operating voltage to these transistors from a source $+W_0$. The circuit also includes three parallel connected unipolar transistors 14, 15 and 16. A fourth transistor 17 is connected in series with the parallel circuit. The same load resistor 18 supplies operating voltage to this group of transistors.

At the right of the figure are two unipolar transistors 20 and 21 connected in series and a second series circuit consisting of unipolar transistors 22 and 23 connected in parallel across the first series circuit. A fifth transistor 24 is connected in parallel with transistor 20. All of these transistors have a supply voltage which is equal to (or greater than) $W_0$ applied through load resistor 19.

The circuit at the right described above produces an output C. This output is inverted by stage 25 and the inverted output $\bar{C}$ is applied as the input voltage to transistor 17. The second or S output of the circuit is taken from the terminal so legended.

Figure 3:
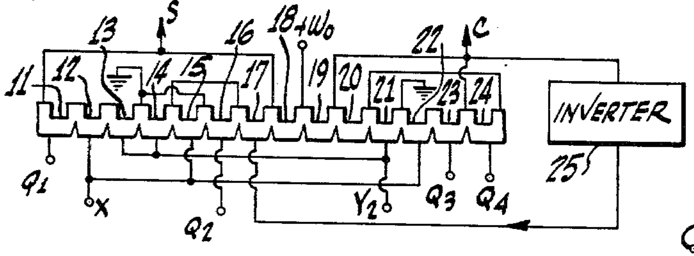
FIG. 3 is a schematic circuit diagram of the circuit of FIG. 2 integrated into a "stick" of semiconductor material.

The topology of the circuit of FIG. 2 is made to be such that all transistors and load resistors can be integrated into a single "stick" of semiconductor material as shown in FIG. 3. The same reference numerals have been applied to the same elements in both circuits. Note that the load resistors are unipolar transistors without any connection to the channel region. Thus, these transistors act as passive elements, the resistance of which is determined by the channel length. The static resistance of a load resistor such as 18 may be four times that of an active element such as 11, 12 and so on.

In the circuit of FIG. 2, the three series connected transistors 11, 12 and 13 act as an "and" circuit. Their output is described by the following Boolean expression: $Q_1XY$. In a similar manner, the four transistors 14, 15, 16 and 17 act as three "and" circuits and their respective outputs are $\overline{C}X$, $\overline{C}Y$, and $\overline{C}Q_2$. The four "and" circuits are connected to a common output terminal S. The common connection of these three circuits can be considered as an "or" circuit so that S, the output of the "or" circuit, may be described by the following Boolean expression:

$$S=Q_1XY+\overline{C}(X+Y+Q_2) \qquad (1)$$

In a similar manner, the portion of the circuit which produces the C output consists of three "and" circuits 22, 23; 20, 21; and 24, 21. The outputs of the three "and" circuits are combined at a common connection C— an "or" circuit. This output is described in the following Boolean equation:

$$C=Q_3X+XY+Q_4Y \qquad (2)$$

Equation 2 may be substituted into Equation 1 to give:

$$S=Q_1XY+(X+Y+Q_2)(\overline{Q_3X+XY+Q_4Y}) \qquad (3)$$

$$(\overline{Q_3X}\,\overline{+XY}\,\overline{+Q_4Y})=\overline{Q}_3\overline{X+XY+Q_4}\overline{Y} \text{ (identity)} \qquad (4)$$

Substituting (4) into (3) and multiplying gives:

$$S=Q_1XY+Q_2(\overline{XY}+\overline{Q}_4\overline{X}+\overline{Q}_3\overline{Y})+\overline{Q}_3X\overline{Y}+\overline{Q}_4\overline{X}Y \qquad (5)$$

$$S=Q_1XY+Q_2\overline{XY}+Q_2\overline{Q}_4\overline{X}+Q_2\overline{Q}_3\overline{Y}+\overline{Q}_3X\overline{Y}+\overline{Q}_4\overline{X}Y \qquad (6)$$

$$\overline{X}=\overline{X}Y+\overline{XY} \text{ (identity)} \qquad (7)$$

$$\overline{Y}=\overline{XY}+X\overline{Y} \text{ (identity)} \qquad (8)$$

Substituting identity (7) for $\overline{X}$ in the third term in Equation 6 and identity (8) for $\overline{Y}$ in the fourth term in Equation 6 gives:

$$S=Q_1XY+Q_2\overline{XY}+Q_2\overline{Q}_4\overline{X}Y+Q_2\overline{Q}_4\overline{XY}+Q_2\overline{Q}_3\overline{XY}+Q_2\overline{Q}_3X\overline{Y}+\overline{Q}_3X\overline{Y}+\overline{Q}_4\overline{X}Y \qquad (9)$$

Rearranging terms gives:

$$S=Q_1XY+Q_2\overline{XY}+Q_2\overline{Q}_4\overline{XY}+Q_2\overline{Q}_3\overline{XY}+Q_2\overline{Q}_4\overline{X}Y+\overline{Q}_4\overline{X}Y+Q_2\overline{Q}_3X\overline{Y}+\overline{Q}_3X\overline{Y} \qquad (10)$$

Simplifying gives:

$$S=Q_1XY+Q_2\overline{XY}\ (1+\overline{Q}_4+\overline{Q}_3)+\overline{Q}_4\overline{X}Y\ (1+Q_2)+\overline{Q}_3X\overline{Y}\ (1+Q_2)$$

which reduces to:

$$S=Q_1XY+Q_2\overline{XY}+\overline{Q}_3X\overline{Y}+\overline{Q}_4\overline{X}Y \qquad (11)$$

From Equation 11 it can easily be seen that when $X=0$ and $Y=0$, then $S=Q_2$; *when* $X=1$ and $Y=1$, then $S=Q_1$; when $X=1$ and $Y=0$, then $S=\overline{Q}_3$; when $X=0$ and $Y=1$, then $S=\overline{Q}_4$. Accordingly, it is sometimes convenient to refer to the various control voltages as $Q_1=Q_{11}$; $Q_2=Q_{00}$; $\overline{Q}_3=\overline{Q}_{10}$; and $\overline{Q}_4=\overline{Q}_{01}$. A table showing this and the corresponding values of C is given below.

*Table III*

| X | Y | S | C |
|---|---|---|---|
| 0 | 0 | $Q_2=Q_{00}$ | 0 |
| 1 | 0 | $\overline{Q}_3=\overline{Q}_{10}$ | $Q_3=Q_{10}$ |
| 1 | 1 | $Q_1=Q_{11}$ | 1 |
| 0 | 1 | $\overline{Q}_4=\overline{Q}_{01}$ | $Q_4=Q_{01}$ |

The operation of the circuit of FIGS. 1 and 2 for the 16 possible combinations of the $Q_1$–$Q_4$ inputs, arranged according to the Gray code, is given in the table below. This operation may be traced from the circuit of FIGS. 2 and 3, or it can be deduced from Equations 2 and 11 above by substituting the values of $Q_1$–$Q_4$ given. $Q_3$ and $Q_4$ appear in the table, whereas $\overline{Q}_3$ and $\overline{Q}_4$ appear in Equation 11. Therefore, if a "1" appears for $Q_3$ or $Q_4$, respectively, in the table, a "0" should be subtsituted for $\overline{Q}_3$ or $\overline{Q}_4$, respectively, in the equation and vice-versa. Columns 1 and 4 in Table IV are identical with the same columns in Table II; columns 2 and 3 in Table IV are complementary to columns 2 and 3, respectively, in Table II. The S output in Table IV corresponds with the logic function column of Table II.

*Table IV*

| Control Voltages | | | | Outputs | |
|---|---|---|---|---|---|
| $Q_2$ | $Q_3$ | $Q_1$ | $Q_4$ | S | C |
| 0 | 1 | 0 | 1 | 0 | X+Y |
| 0 | 1 | 0 | 0 | $\overline{X}Y$ | X |
| 0 | 1 | 1 | 0 | Y | X |
| 0 | 1 | 1 | 1 | XY | X+Y |
| 0 | 0 | 1 | 1 | X | Y |
| 0 | 0 | 1 | 0 | X+Y | XY |
| 0 | 0 | 0 | 0 | $X\overline{Y}+\overline{X}Y$ | XY |
| 0 | 0 | 0 | 1 | $X\overline{Y}$ | Y |
| 1 | 0 | 0 | 1 | $\overline{Y}$ | Y |
| 1 | 0 | 0 | 0 | $\overline{X}+\overline{Y}\equiv\overline{XY}$ | XY |
| 1 | 0 | 1 | 0 | 1 | XY |
| 1 | 0 | 1 | 1 | $X+\overline{Y}$ | Y |
| 1 | 1 | 1 | 1 | $\overline{XY}+XY=\overline{X\overline{Y}+\overline{X}Y}$ | X+Y |
| 1 | 1 | 1 | 0 | $\overline{X}+Y$ | X |
| 1 | 1 | 0 | 0 | $\overline{X}$ | X |
| 1 | 1 | 0 | 1 | $\overline{XY}=\overline{X+Y}$ | X+Y |

In a digital computer many, if not all, of the logic functions shown above which are generated by the circuit are useful in themselves. In addition, the circuit of the invention is capable of a number of uses which are not as evident. For example, the circuit is a simple cross-over switch. Thus, when $Q_1=1$, $Q_2=0$, $Q_3=1$, $Q_4=0$, then $S=Y$ and $C=X$. If the control voltages $Q_3$ and $Q_4$ are changed to "zero" and "one," respectively, and $Q_1$ and $Q_2$ are maintained the same, the S output switches to X and the C output to Y. The circuit can also act as a cross-over switch for a logic function. For example, with $Q_1=1$, $Q_2=0$, $Q_3=1$, $Q_4=1$, the S output is XY and the C output $X+Y$. If the $Q_3$ and $Q_4$ inputs are changed to 0, 0, respectively, and the $Q_1$ and $Q_2$ inputs maintained the same, the S output switches to $X+Y$ and the C output to XY. Table V below illustrates the cross-over switching function.

*Table V*

| $Q_1$ | $Q_2$ | $Q_3$ | $Q_4$ | S | C |
|---|---|---|---|---|---|
| 1 | 0 | 0 | 1 | X | Y |
| 1 | 0 | 1 | 1 | XY | X+Y |
| 1 | 0 | 0 | 0 | X+Y | XY |
| 1 | 0 | 1 | 0 | Y | X |

The circuit of the invention is also capable of producing at one output terminal an uncomplemented logic function and at the same time at the other output terminal the complemented logic function. For example, with the $Q_1$–$Q_4$ inputs 0101, respectively, the S output is $\overline{Y}$ and the C output Y. With the $Q_1$–$Q_4$ inputs 0100, respectively, the S output is $\overline{XY}$ and the C output is XY. With the $Q_1$–$Q_4$ inputs 0110, respectively, the S output is $\overline{X}$ and the C output X. With the $Q_1$–$Q_4$ inputs 0111, respectively, the S output is $\overline{X+Y}$ and the C output is $X+Y$. This is illustrated in Table VI below.

*Table VI*

| $Q_1$ | $Q_2$ | $Q_3$ | $Q_4$ | S | C |
|---|---|---|---|---|---|
| 0 | 1 | 1 | 0 | $\overline{X}$ | X |
| 0 | 1 | 0 | 1 | $\overline{Y}$ | Y |
| 0 | 1 | 0 | 0 | $\overline{XY}$ | XY |
| 0 | 1 | 1 | 1 | $\overline{X+Y}$ | X+Y |

The circuit of the invention is also useful as an encoder. In this use, $Q_1$–$Q_4$ are the information input voltages and X, Y are the control input voltages. The relation among XY and $Q_1$–$Q_4$ is given in Table III.

Figure 7:
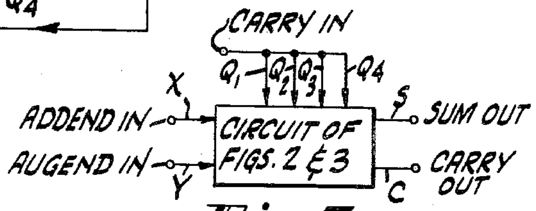
FIGS. 7 and 8 are block circuit diagrams of logic networks made by interconnecting the control wires of the circuits of FIGS. 2 and 3 in different ways.

The circuit of FIG. 7 illustrates another important use of the circuit, that of a full adder. In this use of the circuit, the four inputs to which the $Q_1$–$Q_4$ control voltages are normally applied are connected together and the carry-in signal is applied to the resulting common terminal. The addend and augend input quantities are applied to the X and Y inputs to the circuit, respectively. The S and C outputs of the circuits are the sum and carry outputs, respectively.

Proof that the circuit of FIG. 7 performs full binary addition is given in the following equations:

$$S=Q_1XY+\overline{C}(X+Y+Q_2) \quad (1)$$

Substituting "carry-in" (K) for all Q's gives:

$$S=KXY+\overline{C}(X+Y+K) \quad (12)$$

It is known that $$\overline{C}=\overline{XY}+(\overline{X}Y+X\overline{Y})K \quad (13)$$

This may be substituted into Equation 3 to obtain $$S=K[XY+\overline{XY}]+K[\overline{X}Y+X\overline{Y}] \quad (14)$$

which is the sum equation for full addition.

Also:

$$C=Q_3X+XY+Q_4Y \quad (2)$$

Substituting K for all Q's gives $$C=KX+XY+KY \quad (15)$$

which is the carry equation for full addition.

Figure 8:
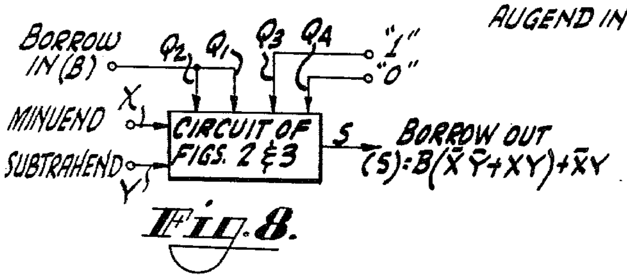

The circuit of the invention can also be used as a borrow generator. The circuit is shown in FIG. 8. A binary "one" is always applied to the $Q_3$ control input and a binary "zero" is always applied to the $Q_4$ control input. The $Q_1$ and $Q_2$ inputs are connected together and the borrow input B is applied to this common connection.

The minuend is applied to the X input and the subtrahend is applied to the Y input. Substituting "1" for $Q_3$, "0" for $Q_4$ and B for $Q_2$ and $Q_1$ in Equation 11 gives:

$$S=BXY+B\overline{XY}+\overline{X}Y \quad (16)$$

$$S=B(XY+\overline{XY})+\overline{X}Y \quad (17)$$

where S is the borrow out quantity. If $B=0$, then $S=\overline{X}$; if $B=1$, then $$S=XY+\overline{XY}+\overline{X}Y=XY+\overline{X}Y+\overline{XY}+\overline{X}Y=Y+\overline{X}$$

From the equations above, it is seen that the circuit of FIG. 8 produces at the S output terminal a borrow quantity.

Figure 9:
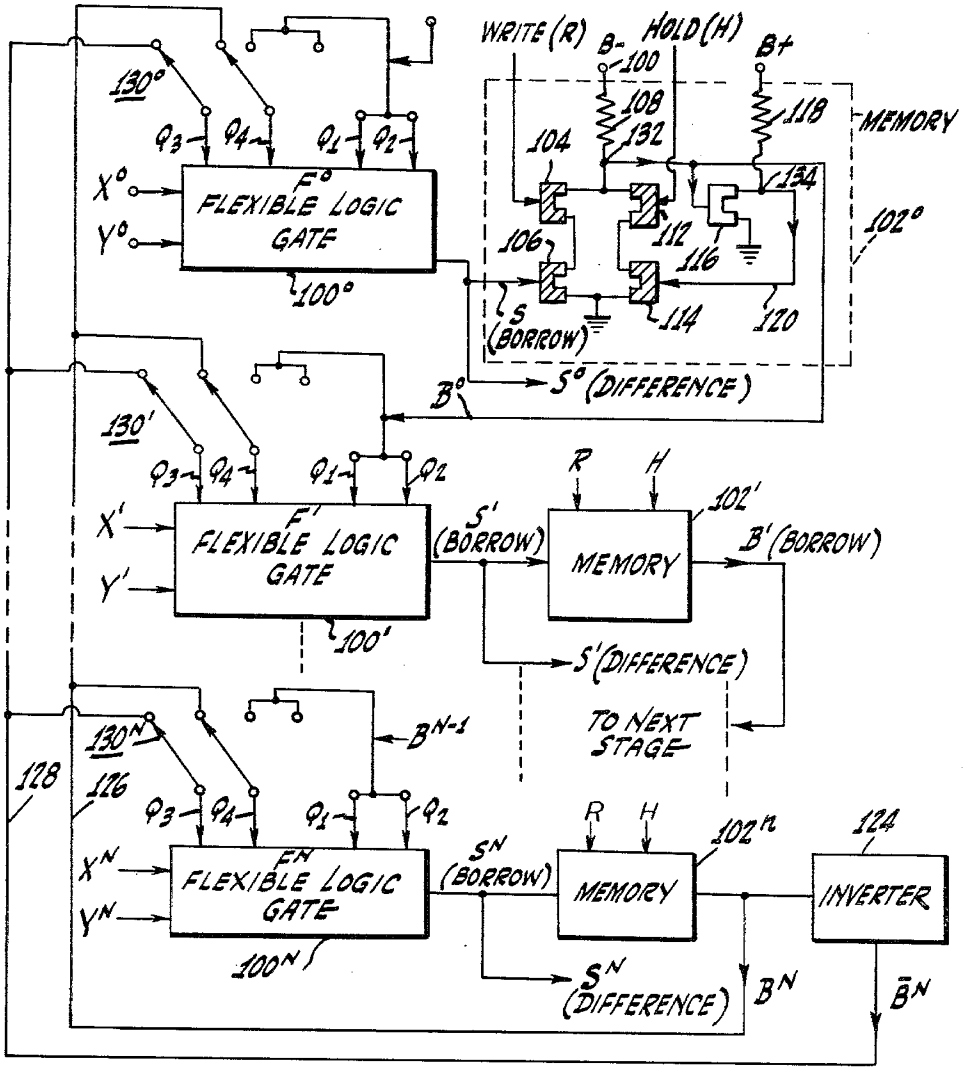
FIG. 9 is a block and schematic circuit diagram of a binary subtractor according to the invention.

A parallel subtractor which incorporates the circuit of FIG. 8 is shown in FIG. 9. The number of stages in the subtractor will depend, of course, upon the number of digits in the minuend and subtrahend. Thus, the number of stages in the subtractor may be 20, 30 or more, however, FIG. 9 only shows the first, second and last (N'th) of the stages. Each stage includes a flexible logic gate like the ones of FIGS. 2 and 3. This stage is legended $100^0$ for the digit of lowest rank; $100^1$ for the digit of next rank, and so on. The flexible logic gate is followed by a memory $102^0$ and the borrow $B^0$ output of the memory is applied to the succeeding flexible logic gate.

The memory is shown in schematic form in the first stage of the subtractor and in block form in the succeeding stages. The memory includes a first pair of P-type unipolar transistors 104, 106 connected in series between a load resistor 108 and ground. A source of operating voltage B− is connected to one terminal 100 of the resistor. A second series circuit consisting of P-type unipolar transistors 112 and 114 is connected in parallel across the first transistors 104 and 106.

The output voltage of the four transistor circuit described above is applied to the gate electrode of N-type transistor 116. The source of this transistor is connected to ground and the drain is connected through a load resistor 118 to a positive supply voltage legended B+. There is a feedback connection 120 between the drain electrode of transistor 116 and the gate electrode of transistor 114.

There are three inputs to the memory circuit $102^0$ described above. One is the S output of the flexible logic gate; another is a write pulse R; and another is a hold pulse H. The S output is applied to the gate electrode of transistor 106; the R input is applied to the gate electrode of transistor 104; and the H input is applied to the gate electrode of transistor 112.

The stages of the subtractor following the first stage are, except for the last stage, identical to the first stage. The last stage includes the same components as the first stage and, in addition, includes an inverter 124 at the output of the memory $102^n$.

The borrow output $B^n$ of the memory $102^n$ is applied to a feedback lead 126. The output of the inverter $\overline{B}^n$ is applied to a second feedback lead 128. The voltages on leads 126 and 128 are applied through switches as the control voltages $Q_4$ and $Q_3$, respectively, for the flexible logic gates. These switches are shown at $130^0$, $130^1$ and so on as mechanical double pole, double throw switches. It is to be understood, however, that in practice the switches may be electronic in nature and may consist of unipolar or other types of transistors.

In the operation of the circuit of FIG. 9, the switches are all thrown to the left to start with as is shown in the figure. It is assumed to start with that the minuend (X) is greater than the subtrahend (Y) so that the last borrow $B^n$ is a "zero." This borrow is applied as the $Q_4$ control voltage and the inverted borrow $\overline{B}^n=1$ is applied as the $Q_3$ control voltage. The borrow input to the first stage $100^0$ is also a "zero."

To start the subtraction, a write voltage level $R=1$ is applied to transistor 104. $R=1$ is a voltage of the order of +5 volts or less and this conditions transistor 104 to conduct. If the borrow output S of the flexible logic gate is also a binary "one," transistor 106 conducts and transistor 104 also conducts. A voltage of several volts negative (a binary "one" for N-type transistor 116) then appears at output terminal 132. This voltage causes transistor 116 to conduct and a few volts positive (a binary "one" for P-type transistor 114) appears at output terminal 134. This output voltage is applied to transistor 114 and conditions transistor 114 to conduct. Before the write pulse terminates, a hold voltage level a few volts positive representing the binary digit "one" is applied to transistor 112. This causes transistor 112 to conduct and, since transistor 114 is already conditioned to conduct, both transistors 112 and 114 conduct. Shortly thereafter the write voltage level returns to binary "zero" and transistor 104 is cut off. However, transistors 112 and 114 remain on in view of the feedback and the binary "one" hold voltage so that a binary "one" continues to appear at output terminal 132. The binary "one" available at terminal 132 is applied as the borrow input $B^0$ to the following flexible logic gate. Note that the control leads for control voltages $Q_1$ and $Q_2$ are tied together as in the circuit of FIG. 8 and that the borrow is applied to these two leads.

The circuit operation can be traced just as well for the case in which the S borrow output of the flexible logic gate represents the binary digit "zero." In this case the borrow output of the memory which is applied to the succeeding stage is a binary "zero."

The time required for a borrow to propagate from one stage to the next following stage is $\Delta T$. The write voltage has a duration slightly greater than $N\Delta T$, where N is the number of stages in the subtractor. Thus, the borrow has sufficient time to propagate to the last stage of the subtractor.

After the interval $N\Delta T$, each memory element 102 is storing a borrow which may have a value of "zero" or "one." At this time, the double pole, double throw switches are thrown to their other position. The effect of doing this is to interconnect all four leads for control voltages $Q_1$–$Q_4$. The circuit configuration is now that of FIG. 7, that is, an adder. The input to each adder stage is the stored borrow of the previous stage. The output available at each sum terminal now is described by the following Boolean equation:

$$S=(X+Y+B)(\overline{XY+XB+YB})+XYB$$

This, however, is the expression for the difference quantity S (Richards, Arithmetic Operations in Digital Computers, 6th printing, page 122).

The difference digits $S_0$ through $S_n$ are available at the leads indicated and may be read out in parallel. Read-out circuits are not shown but are conventional. The read-out may begin an interval $\Delta T$ after the start of the hold voltage.

The circuit of FIG. 9 is also capable of subtracting a larger number from a smaller number. In other words, the circuit is capable of handling a subtrahend $Y^0 \ldots Y^n$ which is larger than the minuend $X^0 \ldots X^n$. In this case, the last borrow output $B^n$ is a binary "one" rather than a binary "zero" and the inverted last borrow $\overline{B}^n$ is a "zero." The "one" output is applied as the $Q_4$ control voltage and the "zero" output is applied as the $Q_3$ control voltage. The effect of doing this is to cause the circuit to function as if the Y's were the minuend and X's the subtrahend. The appropriate difference quantities are obtained in the same manner as already discussed in detail. The value of the voltage on one of the feedback leads from the last stage may be sensed and may be used as an indication of the sign of the difference. For example, if the $B^n$ output is sensed and found to be a "one," this is an indication that the subtrahend $Y^0 \ldots Y^n$ is greater than the minuend $X^0 \ldots X^n$ and the difference obtained should have a minus sign in front of it whereas if the $B^n$ is a "zero," the subtrahend is less than the minuend and the difference obtained should have a plus sign in front of it. The difference always appears as a true positive binary number (rather than as a complement of one or two) with an added sign digit.

Figure 10:
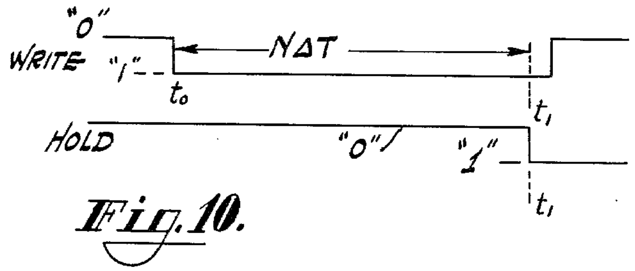
FIG. 10 is a drawing showing the relationship of various timing voltages applied to the circuit of FIG. 9.

FIG. 10 illustrates the timing of the write (R) and hold (H) voltages. There are many circuits available for obtaining such voltages and these are sufficiently well-known that further discussion is not necessary.

The circuit of FIGS. 2 and 3 employ only 14 unipolar transistors, 12 as active elements and two as resistors, and an inverter. The transistors are arranged to be connected in series in a single stick. In practice, the stick length, width and thickness may be 0.14" x 0.02" x 0.005", respectively. Alternatively, the 14 elements may be integrated into two sticks to permit more convenient mounting on a micro-module wafer 0.310" x 0.310" x 0.01". In this event, the stick is preferably broken at the connection between the two resistors 18 and 19.

It is also possible to make flexible logic gates according to the invention using slightly different topologies and/or using more than the 14 elements shown. The design follows the Boolean equations given above. These show, for example, that the C producing circuit may employ six rather than five active elements. These are arranged in three groups, with two series connected resistors in each group, and with the three groups connected in parallel with one another. The Boolean equation is the same as (1), namely, $$C=Q_3X+XY+Q_4Y$$

The last Y, in this case, can represent the sixth transistor and it would be connected in series with transistor 24 (FIG. 2). The series combination would be connected across the series circuit of transistors 20 and 21 (FIG. 2). In like manner, the circuit for producing S can be implemented with eight or nine rather than six active elements. Again, the various structures which are possible follow from the various Boolean equations for S.

Figure 4:
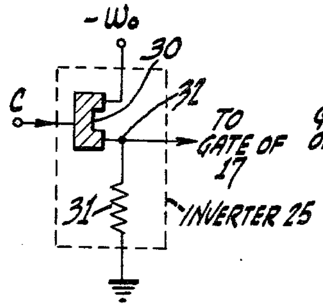
FIGS. 4, 5 and 6 are schematic circuit diagrams of various forms of inverters which may be used in the circuits of FIGS. 2 and 3.
Figure 5:
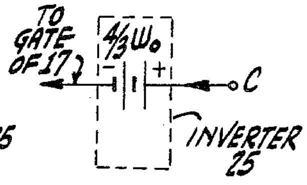
Figure 6:
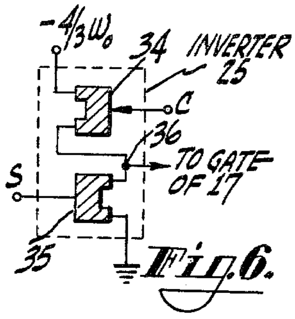

In the circuit of FIGS. 1 and 2, the inverter 25 is illustrated in block form. The inverter can be any one of a number of different circuits as shown in FIGS. 4–6. The circuit of FIG. 4 comprises a P-type unipolar transistor 30 in series with a resistor 31 which may be a second P-type unipolar transistor without a gate electrode connection. The supply voltage for the transistor is $-W_0$.

In operation, the C output of the circuit is applied as the input to the gate electrode. When the C output is binary "zero" (+15 volts), transistor 30 is cut off or substantially cut off and the output of the circuit is zero volts or a few volts negative. This is a binary "one" input for the N-type transistor 17. When the C input is a binary "one" (a few volts positive), transistor 30 is driven into heavy conduction. The voltage at the transistor output terminal 32 rises to a value close to that of $-W_0$ (−15 volts) which is a binary "zero" input for the N-type unipolar transistor 17.

If an inverter of the above type is used with the circuit of FIGS. 2 and 3, transistor 17 should have a smaller pinch-off voltage than the other active transistors. For example, transistor 17 may have a pinch-off voltage of $W_0/3$ and the other transistors a pinch-off voltage of $W_0$. The smaller pinch-off voltage may be achieved by making the channel of less depth.

A second type of inverter is shown in FIG. 5. It consists merely of a battery which floats at both ends and which delivers a voltage of $-4/3W_0$. If the carry output of the circuit is binary "zero" (+15 volts), the output voltage of the inverter is about −5 volts or a binary "one" input to transistor 17. Similarly, when the carry output is a binary "one" (+5 volts or less), then the output voltage of the inverter is a binary "zero" (about −15 volts or more). With this type of inverter all transistors in the circuit of FIGS. 2 and 3 may have the same pinch-off voltage, $W_0$.

A third form of inverter is shown in FIG. 6. This one includes two active unipolar transistors 34 and 35 connected in series. The upper transistor 34 receives its input from the C output terminal and the lower transistor 35 receives its input from the S output terminal. The terminal 36 between the two transistors is connected to the gate electrode of transistor 17. In the circuit of FIG. 6, the power supply voltages are $-4/3W_0$. Similarly, if the inverter of FIG. 6 is employed in the circuit of FIGS. 2 and 3, the power supply voltage for the latter should be $+4/3W_0$.

As is explained in more detail below, neither transistor 34 nor 35 is driven to cut off during operation. Preferably, their pinch-off voltage is $2W_0$, where $W_0$ is the pinch-off voltage for the active transistors of the circuits of FIGS. 2 and 3. The pinch-off voltage is increased by making the channel cross-section greater. Preferably also, the resistance of transistor 34 is $2R_0$ and of transistor 35 is $R_0$, where $R_0$ is the resistance of the active transistors of FIGS. 2 and 3. With the circuit of FIG. 2 used as the inverter for the circuit of FIGS. 2 and 3, all active transistors in the latter may be of the same pinch-off voltage, namely $W_0$ and the same resistance, namely, $R_0$.

The circuit of FIG. 6 operates as follows. Assume first that the input to the gate electrode of transistor 34 is a binary "zero" or +15 volts. This drives transistor 34 towards cut off so that the terminal 36 between transistors 34 and 35 is driven in a positive direction, that is, from a negative value towards ground. Terminal 36 is connected to the gate electrode of transistor 17 (FIGS. 2 and 3) and the positive going voltage applied to this gate electrode causes transistor 17 to conduct more heavily. When this occurs, the output of transistor 17 is driven in the negative direction, that is, it is driven from a more positive value towards ground. This output (that is, the S output) is coupled to the gate electrode of transistor 35 and tends to cause transistor 35 to conduct more heavily. Summarizing the operation, the positive voltage applied to transistor 34 causes its impedance to increase and the feedback voltage which results, which is applied to transistor 35, causes the impedance of transistor 35 to decrease. The overall effect is to drive point 36 towards ground. Neither transistor 34 nor 35 cut off in the process.

When a binary "one" (a voltage which is several volts positive) is applied to the gate electrode of transistor 34, the latter tends to conduct heavily. This makes terminal 36 more negative and this negative voltage applied to the gate electrode of transistor 17 causes the latter to be driven toward cut off. The feedback voltage S which results becomes more positive and this causes transistor 35 to tend to be driven toward cut off. In summary, a binary "one" applied to transistor 34 causes the impedance of transistor 34 to decrease and the impedance of transistor 35 to increase so that terminal 36 between the two transistors becomes negative to the extent about $-W_0$ or $-15$ volts (binary "zero"). Again, neither transistor 90 nor transistor 92 is cut off in the process.

What is claimed is:

1. A flexible logic circuit comprising, in combination; and "and" circuit receptive of signals $Q_1$, X, and Y, each indicative of a binary digit, for producing an output $Q_1XY$; a second "and" circuit receptive of signals $\overline{C}$ and X, each indicative of a binary digit for producing an output $\overline{C}X$; a third "and" circuit receptive of signals $\overline{C}$ and Y for producing an output $\overline{C}Y$; a fourth "and" circuit receptive of signals $\overline{C}$ and $Q_2$, each indicative of a binary digit, for producing an output $\overline{C}Q_2$; and an "or" circuit receptive of $Q_1XY$, $\overline{C}X$, $\overline{C}Y$ and $\overline{C}Q_2$ for producing an output $S=Q_1XY+\overline{C}(X+Y+Q_2)$, where $C=Q_3X+XY+Q_4Y$; $Q_1$–$Q_4$ are control voltages; and X and Y are input variable voltages.

2. A flexible logic circuit for producing different logic functions of two binary input signals X and Y in response to different permutations of four binary control signals $Q_1$–$Q_4$ comprising, in combination, an "and" circuit to which $Q_4$ and Y are applied for producing an output $Q_4Y$; a second "and" circuit to which X and Y are applied for producing an output XY; a third "and" circuit to which $Q_3$ and X are applied for producing an output $Q_3X$; an "or" circuit to which $Q_4Y$, XY and $Q_3X$ are applied for producing an output $C=Q_4X+XY+Q_3X$; an inverter to which C is applied for producing an output $\overline{C}$; a fourth "and" circuit to which $Q_1$, X and Y are applied for producing an output $Q_1XY$; a fifth "and" circuit to which $\overline{C}$ and Y are applied for producing an output $\overline{C}Y$; a sixth "and" circuit to which $\overline{C}$ and X are applied for producing an output $\overline{C}X$; a seventh "and" circuit to which $\overline{C}$ and $Q_2$ are applied for producing an output $\overline{C}Q_2$; and a second "or" circuit to which $Q_1XY$, $\overline{C}Y$, $\overline{C}X$, and $\overline{C}Q_2$ are applied for producing an output $S=Q_1XY+\overline{C}(Y+X+Q_2)$.

3. A circuit as set forth in claim 2, wherein each "and" circuit comprises series connected unipolar transistors.

4. A circuit as set forth in claim 2, wherein all "and" circuits are topologically arranged in series and integrated into one piece of semiconductor material.

5. A flexible logic circuit for producing different logic functions of binary input signals X and Y in response to permutations of binary control signals $Q_1$, $Q_2$, $Q_3$ and $Q_4$ comprising, in combination, an "and" circuit including three unipolar transistors in series with a fourth unipolar transistor, said fourth transistor serving as a resistor, said three transistors receiving said signals X, Y and $Q_1$, respectively; a second "and" circuit comprising a fifth and sixth unipolar transistor in series with said fourth transistor, said fifth transistor receiving a signal $\overline{C}$ and said sixth transistor receiving said signal X; a third "and" circuit comprising a seventh unipolar transistor in series with said fourth and fifth transistors, and receiving said signal Y; a fourth "and" circuit comprising an eighth unipolar transistor in series with said fourth and fifth transistors and receiving said signal $Q_2$; an output terminal between said fourth transistor and the transistors to which it is connected at which an output signal $$S=Q_1XY+\overline{C}(X+Y+Q_2)$$

is available; a fifth "and" circuit comprising ninth, tenth, and eleventh unipolar transistors connected in series, said ninth transistor serving as a resistor and said tenth and eleventh transistors receiving said signals X and $Q_3$; a sixth "and" circuit comprising twelfth and thirteenth unipolar transistors connected in series with said ninth transistor and receiving said signals X and Y, respectively; a seventh "and" circuit comprising a fourteenth unipolar transistor in series with said ninth and thirteenth transistors and receiving said signal $Q_4$; an output terminal between said ninth transistor and the transistors to which it is connected at which an output $C=Q_3X+XY+Q_4Y$ is available; and means for producing the complement $\overline{C}$ of said output and applying the same to said fifth transistor.

6. A flexible logic circuit as set forth in claim 5, in which said transistors are integrated into one piece of semiconductor material.

7. The circuit of claim 2 in which one of $Q_3$ and $Q_4$ always represents the binary digit "one" and the other always represents the binary digit "zero," $Q_1=Q_2=B$, where B is a binary input signal representing a borrow quantity, and X and Y represent two binary numbers one of which is to be subtracted from the other.

8. A parallel binary subtractor comprising, in combination, *n* binary subtraction stages, each for receiving a borrow, minuend and subtrahend binary quantity of different rank, and each for producing a borrow output; *n* memories, each for receiving and storing a borrow output of different rank, and each for applying its stored borrow quantity to the subtraction stage of next higher rank; and means for converting each said binary subtraction stage to a binary adder stage after all borrow outputs are stored, whereby each said stage produces a difference output quantity of different rank.

9. A parallel binary subtractor comprising, in combination, $n$ binary subtraction stages, each for receiving a borrow B, minuend X, and subtrahend Y binary quantity of different rank and each for producing a borrow S output, each said stage including an "and" circuit to which $Q_4$ and Y are applied for producing an output $Q_4Y$, a second "and" circuit to which X and Y are applied for producing an output XY; a third "and" circuit to which $Q_3$ and X are applied for producing an output $Q_3X$, an "or" circuit to which $Q_4Y$, XY and $Q_3X$ are applied for producing an output $C=Q_4X+XY+Q_3X$, an inverter to which C is applied for producing an output $\overline{C}$, a fourth "and" circuit to which $Q_1$, X and Y are applied for producing an output $Q_1XY$, a fifth "and" circuit to which $\overline{C}$ and Y are applied for producing an output $\overline{C}Y$, a sixth "and" circuit to which $\overline{C}$ and X are applied for producing an output $\overline{C}X$, a seventh "and" circuit to which $\overline{C}$ and $Q_2$ are applied for producing an output $\overline{C}Q_2$, and a second "or" circuit to which $Q_1XY$, $\overline{C}Y$, $\overline{C}X$ and $\overline{C}Q$ are applied for producing an output $S=Q_1XY+\overline{C}(Y+X+Q)$; $n$ memories each for receiving and storing a borrow S output of different rank, and each for applying its stored borrow quantity to the subtraction stage of next higher rank; and means for converting each binary subtraction stage to a binary adder stage after all borrow outputs are stored, whereby each said stage produces a difference output quantity of different rank where, during subtraction, $Q_1=Q_2=B$, the borrow output stored in the memory for the subtraction stage of next lower rank, $Q_3$ equal the borrow quantity $B^n$ stored in the memory for the subtraction stage of highest rank, and $Q_4$ equals $\overline{B}^n$, and wherein said means for converting each said binary subtraction stage to a binary adder stage comprising means for dis-connecting the $B^n$ and $\overline{B}^n$ input to each binary subtraction stage and making $Q_3$ and $Q_4$ equal to $Q_1$.

References Cited by the Examiner

UNITED STATES PATENTS

| | | | |
|---|---|---|---|
| 2,850,647 | 9/58 | Fleisher | 307—88.5 |
| 2,926,850 | 3/60 | Richards | 235—175 |
| 2,954,168 | 9/60 | Maddox | 235—175 |
| 2,992,339 | 7/61 | Meyers | 307—88.5 |
| 3,081,032 | 3/63 | Kier et al. | 235—175 |
| 3,100,837 | 8/63 | Gisek | 235—175 |

OTHER REFERENCES

Richards, Arithmetic Operations in Digital Computers, D. Van Nostrand and Co. Inc., Princeton, N.J. (March 17, 1955) (pp. 31 to 38 relied on).

Integrated Device Using Direct-Coupled Unipolar Transistor Logic (Wallmark and Marcus), IRE Transactions on Electronic Computers, June 1959 (pp. 98–105 relied on). TK 7885 AI2.

MALCOLM A. MORRISON, *Primary Examiner.*

CORNELIUS D. ANGEL, *Examiner.*